Patented Dec. 31, 1929

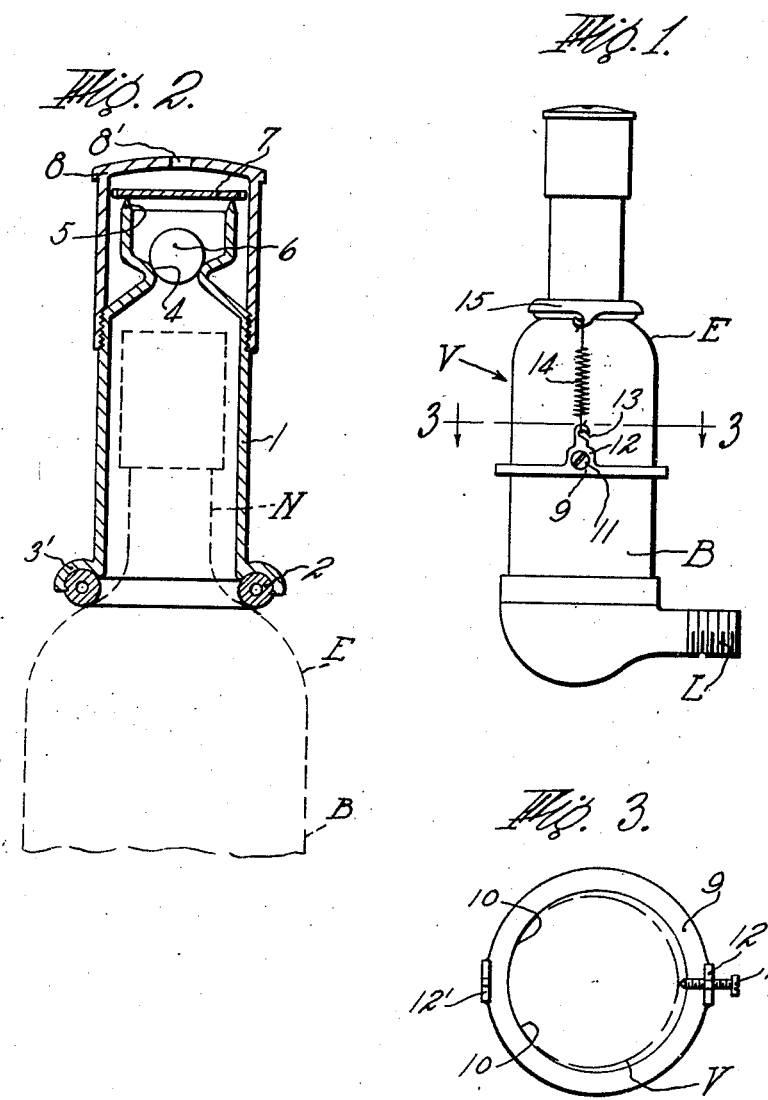

1,741,402

UNITED STATES PATENT OFFICE

ALEXANDER A. CAMPBELL, OF WEST SPRINGFIELD, MASSACHUSETTS

RADIATOR VALVE

Application filed September 21, 1927. Serial No. 221,068.

This invention relates to improvements in radiator valves and more particularly to improvements in vacuum valves adapted to be used in connection with air vent valves for steam radiators.

As is well known, the ordinary and common form of vent valve used with steam radiators and systems functions first to vent the system or allow the escape of air therefrom, and then when heated by the steam it closes automatically to prevent the escape of steam. With this type of valve, when the steam pressure drops so that the valve cools, it automatically opens and allows air to enter the radiator and system. It is desirable to prevent air being drawn back into the system as it will function more efficiently when operating under a partial vacuum. Accordingly my invention is directed to an apparatus for use in connection with vent valves which functions to transform an ordinary vent valve into a vacuum valve so that the system may be air vented and at the same time function as a vacuum system.

Vent valves in common use are in many sizes and shapes and are characterized by a vent port in the upper side thereof which extends either through the wall of the upper side or through the top or side of a nipple extending from the upper side of the valve.

According to the novel features of my invention, I provide a vacuum valve which is arranged and adapted to be secured to and used in connection with various vent valves. To this end, I provide a valve body having a sealing ring for enclosing the vent port and adapted to rest or seat on the upper side of various forms of vent valves, while for securing the vacuum valve to a vent valve I provide a member adapted to be clamped to the body of the vent valve and means connecting said vacuum valve and member adapted to hold said valve in sealed relation on the upper side of the vent valve body.

The invention in the form at present preferred is shown in connection with vent valves of a certain form, but it will be readily appreciated that the invention is adapted for use in connection with any of the common forms of vent valves now in use.

In the drawings:

Fig. 1 is a side elevational view of the vacuum valve of my invention applied to a vent valve;

Fig. 2 is a vertical sectional view at a larger scale taken through a vacuum valve of my invention; and Fig. 3 is a sectional view taken on the line 3—3 of Fig. 1.

Referring to the drawings in detail, V represents a typical vent valve which has a vent neck N extending upwardly from the upper side E of its body B. The neck of the valve may have a vent opening or port either at the top or side thereof to permit air to pass therethrough. Air is forced outwardly through the port by the pressure of steam in the radiator or system, and a valve interiorly of the vent valve body is arranged to close off the opening accordingly as it is operated or caused to operate by steam entering the valve from the radiator. The vent valve thus briefly described will function under ordinarily conditions to allow air to be expelled from the radiator and system, and will close automatically to prevent the escape of steam when it has reached the valve; but will not prevent air being drawn back into the radiator and system when the steam pressure in the system decreases so that the valve cools off so as to open.

It is to provide a valve to prevent air being drawn back into the radiator that my invention relates so that thereby a vacuum will be produced in the system as the steam pressure decreases.

According to the embodiment of the invention illustrated, I provide a valve body 1 for enveloping or enclosing the neck N of the vent valve V which carries a packing, sealing or seating ring 2, preferably of some resilient or yieldable material such as rubber, at its lower end, as shown. The ring 2 may be partially embraced or held by a suitable rim or flange 3' formed on the lower end of the valve body 1. The ring is adapted to rest or seat on the upper end E of the vent valve so as to conform to the contour thereof and accordingly as the body 1 is pressed onto the vent valve by means later to be described it will provide a seal between the valve body and vent valve upper side so as to prevent the passage of air between the vent valve and vacuum valve body.

The upper end of the body 1 is formed to provide valve seats 4 and 5 and a ball valve 6 and a flat disc-like valve 7 are provided to function with and rest upon their respective seats, as shown. The seats and valves are preferably arranged so as to be opened by air from the vent port of the vent valve; while when there is a tendency for the system to pull air downwardly therepast they will close after the manner of a check valve. The construction and arrangement of these valves and seats may be varied within wide limits and they may be made of any suitable material desired so as to be adapted to function properly under various conditions.

It will be obvious that when desired one of the valves may be omitteed as under ordinary conditions one only of the valves will efficiently operate to prevent air from entering the vent port of the vent valve. A closure or cap 8 in threaded engagement with the body 1 has a vent port or opening 8′ therethrough which permits the escape of air from the valves, and functions to protect and conceal the valves as well as to restrict or limit their upward movement.

To hold the body in place on a vent valve, I provide the following. A ring-like clamping member 9 arranged to fit loosely over various sized vent valves of common form has angularly disposed edges 10 which are arranged to engage or abut the side of a vent valve body while a binding screw 11 is threaded in an upwardly extending lug 12 at the other side of the member 9 and provided for abutting the vent valve body so as to draw or bind the ring onto the vent valve, as shown in Fig. 3.

A lug 12′ similar to the lug 12 is carried by the opposite side of member 9 and both of the lugs 12 and 12′ are provided with openings or slots 13 at the upper sides thereof which are adapted to receive an end of a tension spring 14. The other end of said spring is engaged in slots or openings 15 disposed at opposite sides of the flange of the body 1.

The springs 14 may take any desired form, but will preferably be adapted to force the body 1 downwardly when hooked or connected to the member 9 which is clamped to the vent valve.

By providing the packing or sealing ring of a yieldable material, it is possible by means of the springs to provide an air tight joint between the valve body 1 and vent valve so that the vacuum valve will function as an efficient check valve to prevent air being drawn in through the vent valve. It will be observed that the sealing ring is sufficiently flexible to conform to the contour of the upper side of a variety of vent valves and that likewise the clamping ring may be secured to valves of various sizes so that by the spring connections the parts may be used in connection with vent valves of various sizes and shapes.

I am aware that many changes may be made in the form of the invention without departing from the scope thereof and I prefer therefor to be limited, if at all, by the appended claim rather than by the foregoing description.

What I claim is:

The combination of a radiator vent valve including a cylindrical body having an upper side provided with inwardly and upwardly tapering surfaces with a vacuum valve comprising, a cylindrical body, a flange at the lower side thereof formed to provide an annular seat for receiving an annular packing ring, an annular packing ring of yieldable material in said seat having an inner diameter which is less than the outer diameter of said vent valve body for resting on the upper tapering surfaces thereof, a member for encircling the body of the vent valve, means associated therewith for clamping said member to said body, springs connected to said member and said flange at the lower side of the vacuum valve body whereby the packing ring is pressed between the vent and vacuum valve bodies, a valve in the upper side of said vacuum valve body and a cap for embracing the upper side of said latter body to enclose said valve and provided with a vent port therethrough.

In testimony whereof I have affixed my signature.

ALEXANDER A. CAMPBELL.